US006775721B1

(12) United States Patent
Tran (10) Patent No.: US 6,775,721 B1
(45) Date of Patent: Aug. 10, 2004

(54) METHOD AND SYSTEM FOR HANDLING A DATA STREAM FROM OPTICAL MEDIA UTILIZING AUTOMATIC LINK SECTOR DETECTION

(75) Inventor: Paul Thanh Tran, Milpitas, CA (US)

(73) Assignee: Promos Technologies Inc., Hsing-Chu (TW)

( * ) Notice: Subject to any disclaimer, the term of this patent is extended or adjusted under 35 U.S.C. 154(b) by 0 days.

(21) Appl. No.: 09/569,370

(22) Filed: May 11, 2000

(51) Int. Cl.[7] .............................................. G06F 13/00
(52) U.S. Cl. .............................. 710/52; 710/4; 710/20; 710/21; 710/33; 710/48; 710/52; 710/53; 710/260
(58) Field of Search .............................. 710/4, 20, 21, 710/33, 48, 52, 53, 260

(56) References Cited

U.S. PATENT DOCUMENTS

| 5,528,570 A | * | 6/1996 | Kondo | 369/48 |
| 5,946,447 A | * | 8/1999 | Nakagawa et al. | 386/95 |
| 5,960,452 A | * | 9/1999 | Chi | 711/117 |
| 6,141,772 A | * | 10/2000 | Hashimoto | 714/16 |

* cited by examiner

Primary Examiner—Jeffrey Gaffin
Assistant Examiner—Mohammad O. Farooq
(74) Attorney, Agent, or Firm—Sawyer Law Group LLP (57) ABSTRACT

The present invention provides an improved method and system for link detection and handling. The method includes detecting one of the plurality of link sectors; generating an interrupt signal; determining a buffer method selection; buffering the plurality of data sectors only, if a link skip buffer method is selected; and buffering the plurality of data sectors and the plurality of link sectors, except for a link block, and allocating a sector in a buffer for the link block, if a link buffer method is selected. The present invention provides a hardware approach to link sector detection and handling. Instead of passing the data to a system software prior to link sector detection, the method and system in accordance with the present invention performs the link sector detection in the controller hardware. When the controller detects the link sectors, it automatically either skips or buffers the link sectors depending upon the configuration of the controller. By performing the link sector detection in hardware, significant processing time is saved.

40 Claims, 9 Drawing Sheets

METHOD AND SYSTEM FOR HANDLING A DATA STREAM FROM OPTICAL MEDIA UTILIZING AUTOMATIC LINK SECTOR DETECTION

FIELD OF THE INVENTION

The present invention relates to optical media, and more particularly to the reading of data from an optical media.

BACKGROUND OF THE INVENTION

Figure 1A:
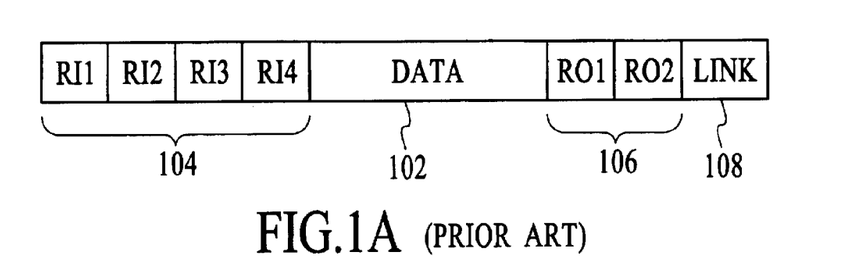
FIG. 1A illustrates a conventional structure of the sectors from a data stream.

Data retrieved from an optical media, such as a Compact Disc-Writable (CD-W) or a Compact Disc-Rewritable (CD-RW), need to be decoded by a controller of the optical drive before the data may be used. In the CD decoding process, every 2352 bytes of the data stream is defined as a sector. FIG. 1A illustrates a conventional structure of the sectors from a data stream. The sectors include data sectors 102 which contain the actual data. Preceding the data sectors 102 are four Read In (RI) sectors 104. Following the data sectors 102 are two Read Out (RO) sectors 106 and a link block 108. The RI and RO sectors 104–106 are formed by the power up and power down time, respectively, required by the laser in writing the data sectors 102. The link block 108 is a gap between RO2 of the last data sector 102 and RI1 of the next data sector. Thus, separating each group of data sectors 104 are seven link sectors, comprising the RO sectors 106, the link block 108, and the RI sectors 104.

Figure 1B:
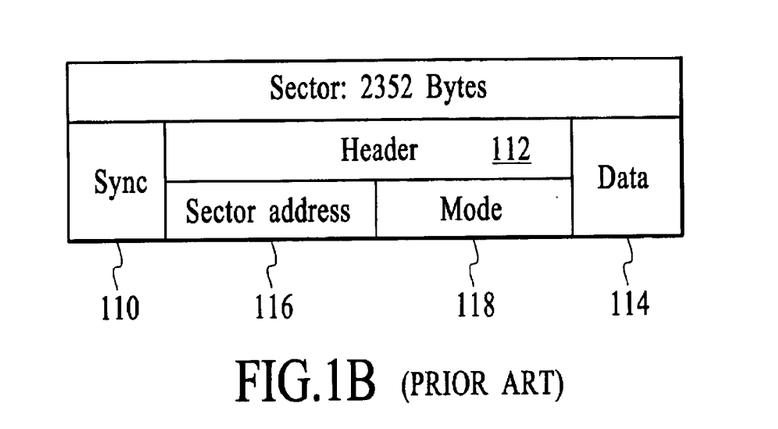
FIG. 1B illustrates the conventional structure of each sector in a data stream.

FIG. 1B illustrates the conventional structure of each sector in a data stream. Each sector contains a sync field 110, a header field 112, and a data field 114. The sync field 110 is a fixed twelve byte pattern used to separate the sectors and which can be detected by a Sector Sync Detector of the decoder to maintain synchronization with the beginning of the each sector. The header field 112 specifies the sector address 116 and the sector mode 118. The sector mode 118 has a 3-bit sub-field which indicates the block type. There are eight different types of sectors for CD-R or CD-RW media, as set forth in Table 1 below. Only the Data Block sectors are part of the actual data sectors 102. The rest of the seven types are referred to as link sectors 104–108 which indicate the logical gap between the actual data sectors 102.

TABLE 1

| | Block Indicator |
|---|---|
| 000 | Data Block |
| 001 | Fourth Run-in Block (RI4) |
| 010 | Third Run-in Block (RI3) |
| 011 | Second Run-in Block (RI2) |
| 100 | First Run-in Block (RI1) |
| 101 | Link Block |
| 110 | Second Run-out Block (RO2) |
| 111 | First Run-out Block (RO1) |

Figure 2:
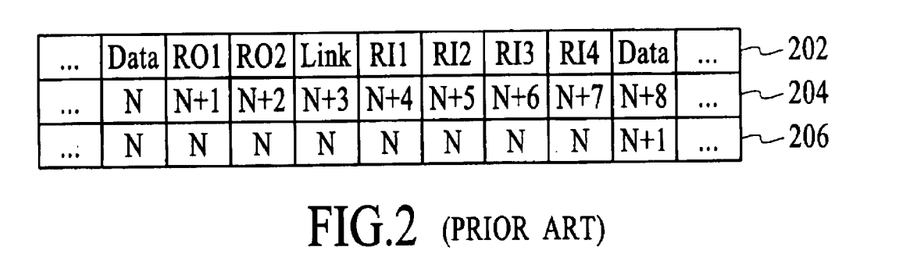
FIG. 2 illustrates sector addresses for the incremental and freeze modes.

When reading CD-R or CD-RW media, the sector address 116 for a data sector 102 is always incremental from the previous data sector. However, for the link sectors 104–108, the sector address 116 can be in either incremental or freeze mode across the link sectors 104–108. FIG. 2 illustrates sector addresses for the incremental and freeze modes. The first line 202 indicates the sector type. The second line 204 indicates each sector's address in the incremental mode. The third line 206 indicates each sector's address in the freeze mode. The mode is set at the time the sectors are written onto the media. These addresses are used by the decoder to locate the data sector requested by the system. The decoder has a register in which it maintains the next expected sector address, based upon the mode. If the expected sector address does not match the actual sector address, then the integrity of the data is questionable. Appropriate action may then be taken. The structure of the sectors in the data stream illustrated in FIGS. 1A, 1B, and 2 is standard in the industry.

Conventionally, the decoder buffers the data sectors 102 and the link sectors 104–108 and passes them to a host computer without differentiating between the data sectors 102 and the link sectors 104–108. A software on the host computer is then responsible for detecting and handling the link sectors 104–108 and obtaining the data from the data sectors 102. The host has a choice to either discard the link sectors 104–108 or extract some information from them. When the software finds the link sector, it must stop buffering and reread the media to look for and confirm the location of the next data sector. This rereading is very costly in time. Thus, the conventional software approach is inefficient.

Accordingly, there exists a need for an improved method and system for link sector detection and handling for optical media. The method and system should be more efficient than the conventional software approach. The present invention addresses such a need.

SUMMARY OF THE INVENTION

The present invention provides an improved method and system for link detection and handling. The method includes detecting one of the plurality of link sectors; generating an interrupt signal; determining a buffer method selection; buffering the plurality of data sectors only, if a link skip buffer method is selected; and buffering the plurality of data sectors and the plurality of link sectors, except for a link block, and allocating a sector in a buffer for the link block, if a link buffer method is selected. The present invention provides a hardware approach to link sector detection and handling. Instead of passing the data to a system software prior to link sector detection, the method and system in accordance with the present invention performs the link sector detection in the controller hardware. When the controller detects the link sectors, it automatically either skips or buffers the link sectors depending upon the configuration of the controller. By performing the link sector detection in hardware, significant processing time is saved.

DETAILED DESCRIPTION

The present invention provides an improved method and system for link sector detection and handling for optical media. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention provides a hardware approach to link sector detection and handling in the controller. Instead of passing the data to a system software prior to link sector detection, the method and system in accordance with the present invention performs the link sector detection in the controller hardware. When the controller detects the link sectors, it automatically either skips or buffers the link sectors depending upon the configuration of the controller. By performing the link sector detection in hardware, significant processing time is saved.

To more particularly describe the features of the present invention, please refer to FIGS. 3 through 10 in conjunction with the discussion below.

Figure 3:
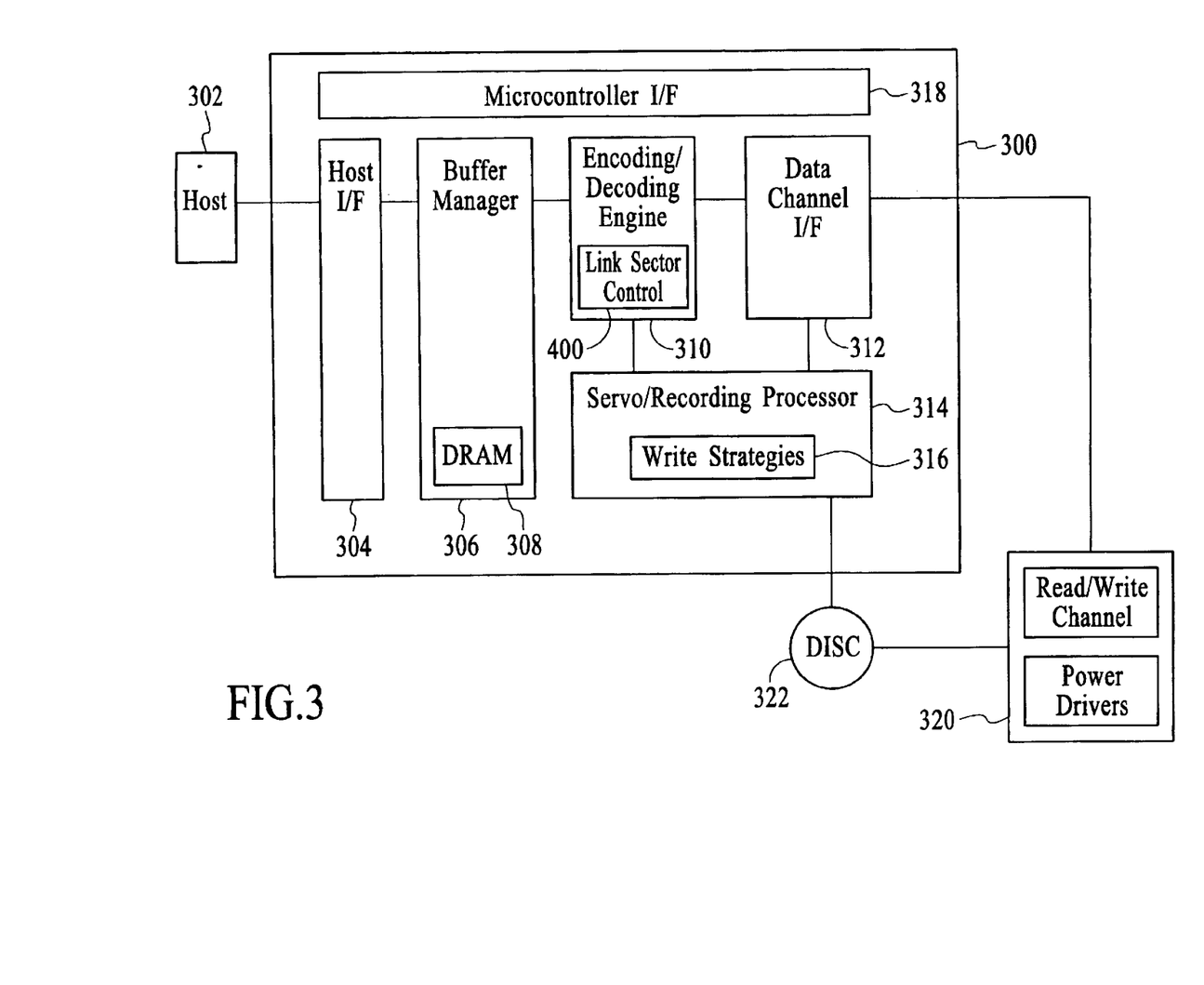
FIG. 3 is a block diagram illustrating a preferred embodiment of a controller which may use the method and system in accordance with the present invention.

FIG. 3 is a block diagram illustrating a preferred embodiment of a controller which may use the method and system in accordance with the present invention. The elements 304–318 represent the logical architecture of the controller 300. The controller 300 comprises a host interface 304, a buffer manager 306 with an embedded memory 308, an integrated encoding/decoding engine 310, a data channel interface 312, an integrated servo/recording processor 314 embedded with the write strategies 316, and a microcontroller interface 318. In the preferred embodiment, the embedded memory 308 is an embedded dynamic random access memory (DRAM). The integrated servo/recording processor 314 provides the mechanical control of the disc 320 and the spindle and sledge (not shown) of the drive for both reading and writing of data. The servo/recording processor 314 interfaces with the disc 322 in the writing of data. Integrated into the processor 314 are the write strategies 316 which controls the writing of the data so that the data is in a standard format. The write control logic in accordance with the present invention would be part of the servo/recording processor 314 for controller 300. The controller 300 is further described in co-pending U.S. Patent Application entitled "Integrated Controller To Process Both Optical Reads And Optical Writes Of Multiple Optical Media", Serial No. 09/652,254, filed on Aug. 30, 2000. Applicant hereby incorporates this patent application by reference.

Figure 4:
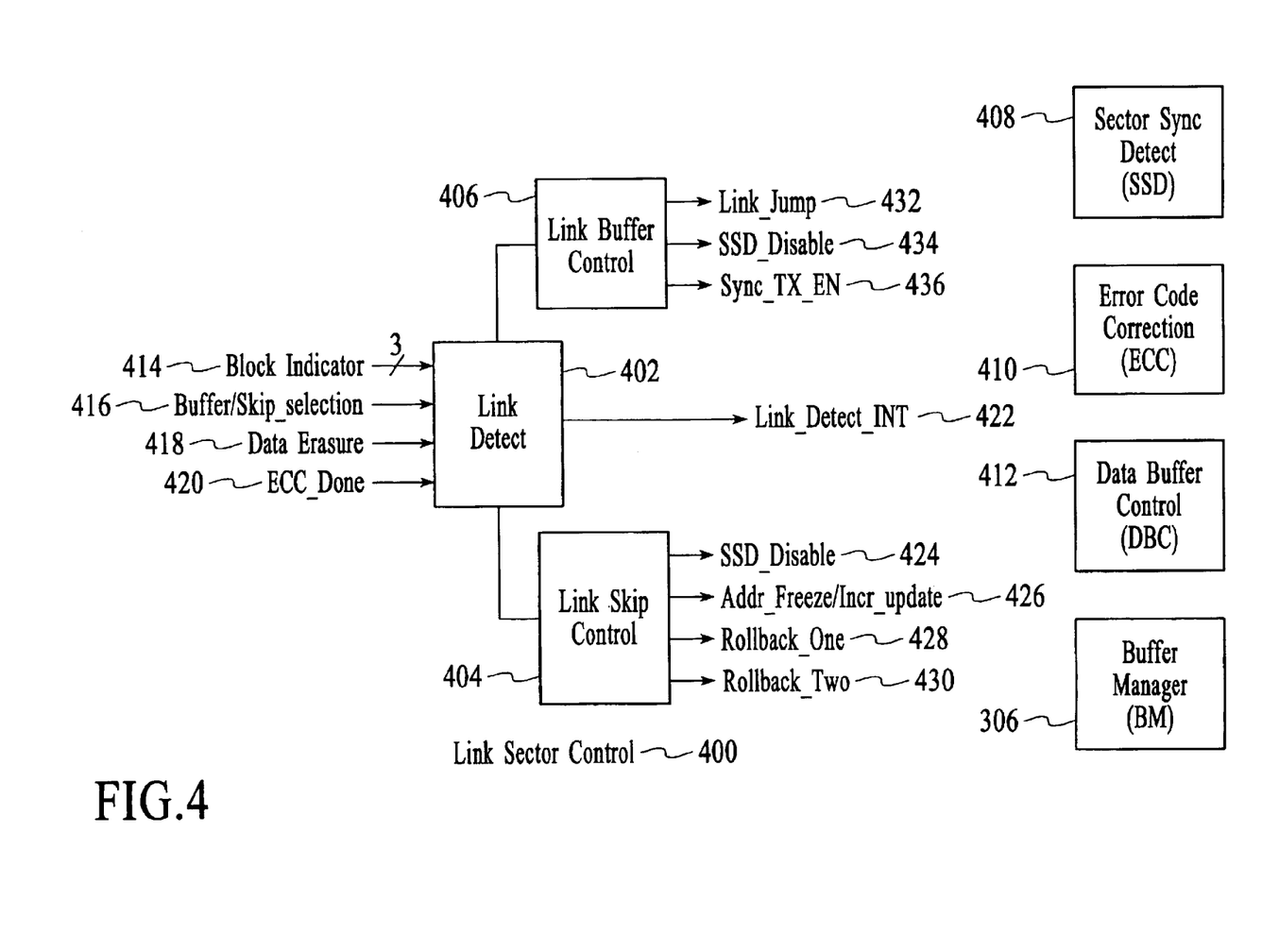
FIG. 4 is a logical block diagram of a preferred embodiment of a Link Sector Control, along with other related circuit blocks, in accordance with the present invention.

The method and system in accordance with the present invention is implemented as a Link Sector Control unit 400, which is part of the integrated encoder/decoder engine 310. FIG. 4 is a logical block diagram of a preferred embodiment of a Link Sector Control 400, along with other related circuit blocks, in accordance with the present invention. The Link Sector Control 400 comprises a Link Detect unit 402, a Link Skip Control unit 404, and a Link Buffer Control unit 406. The circuit blocks with which the Link Sector Control 400 interacts includes: the Sector Sync Detect 408 (SSD), which detects the sync pattern at the beginning of each sector; the Error Code Correction 410 (ECC), which performs correction of data error; the Data Buffer Control 412 (DBC), which controls the buffering of sectors into the DRAM 308; and the Buffer Manager (BM) 306. In the preferred embodiment, the SSD 408, the ECC 410, and the DBC 412 are part of the integrated encoder/decoder engine 310 of controller 300.

The Link Detect 402 has four inputs: a 3-bit sector block indicator 414 (Block_Indicator), a link skip/buffer selection 416 (Buffer/Skip_selection), a data erasure bit (Data_Erasure), and an ECC done signal 420 (ECC_Done). The sector block indicator signal 414 provides the 3-bits according to Table 1 above. The link skip/buffer selection signal 416 indicates which method of handling a detected link sector has been selected, i.e., to skip or buffer the link sectors. The data erasure bit 418 indicates whether or not data error is associated with the sector header. If ECC correction is performed on the sector, the ECC done signal 420 indicates whether or not the correction has been completed.

Figure 5:
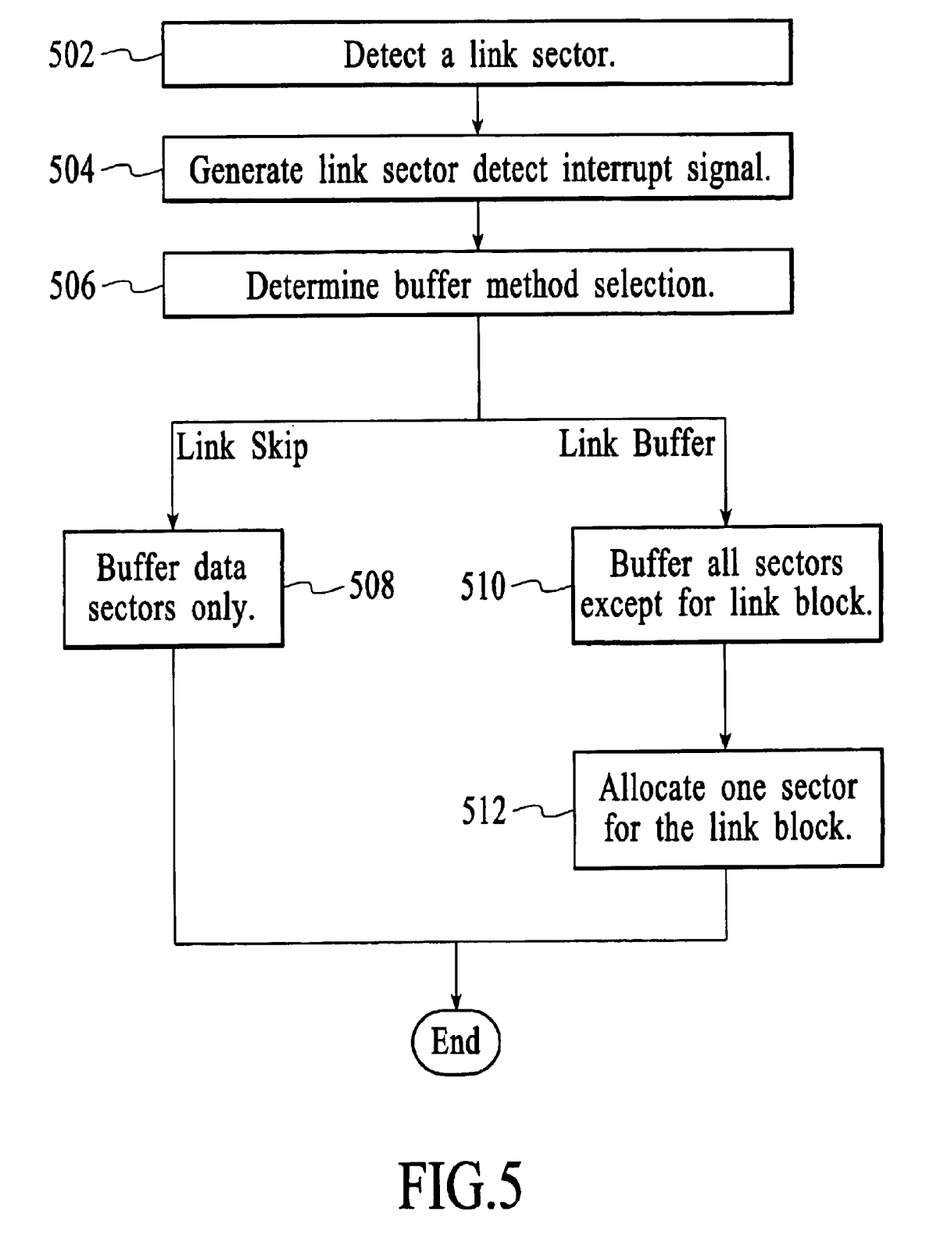
FIG. 5 illustrates a preferred embodiment of a method for automatic link detection and handling in accordance with the present invention.

FIG. 5 illustrates a preferred embodiment of a method for automatic link detection and handling in accordance with the present invention. First, the Link Detect 402 detects a link sector, via step 502. The first link sector after a data sector is RO1. The Link Detect 402 is able to detect the link sector if the erasure bit 418 is zero, which indicates no data error associated with the sector header 112. Otherwise, the Link Detect 402 waits for the ECC 410 to correct the header 112 before it checks for the link sector. Once the Link Detect detects the link sector, it generates a link sector detect interrupt signal 422 (Link_Detect-INT), via step 504. Then, the buffer method selected is determined, via step 506. The Link Sector Control 400 could be configured to perform either the link skip method or the link buffer method. The link skip method only buffers the data sectors 102, i.e., the link sectors 104–108 are skipped. The link buffer method buffers all the sectors except for the link block 108, i.e., the data 102, RI 104, and RO 106 sectors only are buffered. The method selected is indicated by the link skip/buffer selection signal 416. The Link Detect 402 enables either the Link Skip Control 404 or the Link Buffer Control 406 based on the link skip/buffer selection signal 416. If the method chosen is link skip, then the data sectors 102 only as buffered, via step 508. If the method chosen is link buffer, then the data sectors 102, the RO sectors 106, and the RI sectors 104 only are buffered, via step 510, and one sector is allocated for the link block 108 in the buffer, via step 512.

Figure 6:
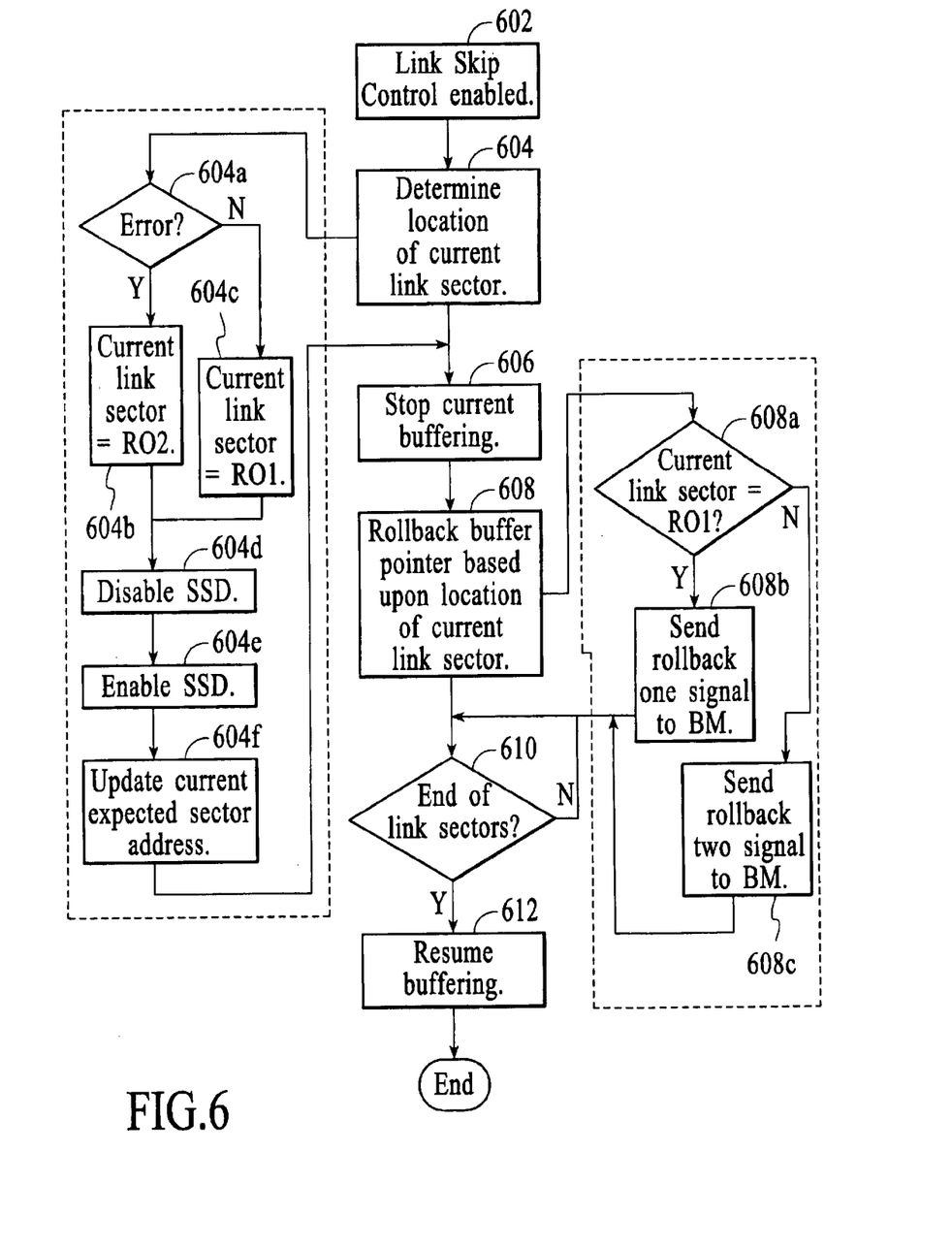
FIG. 6 is a flowchart illustrating a preferred embodiment of the method in accordance with the present invention when the link skip method has been selected.

FIG. 6 is a flowchart illustrating a preferred embodiment of the method in accordance with the present invention when the link skip method has been selected. First, the Link Skip, Control 404 is enabled by the Link Detect 402, via step 602. The Link Skip Control 404 determines the location of the current link sector, via step 604. In the preferred embodiment, if it is determined that there is no error and no ECC correction performed, via step 604a, then the current sector is RO1, via step 604c. The current sector is RO2 if there is error and ECC correction is performed, via step 604b. This is due to the timing difference between the processing of a sector with no error and a sector with error.

Figure 7:
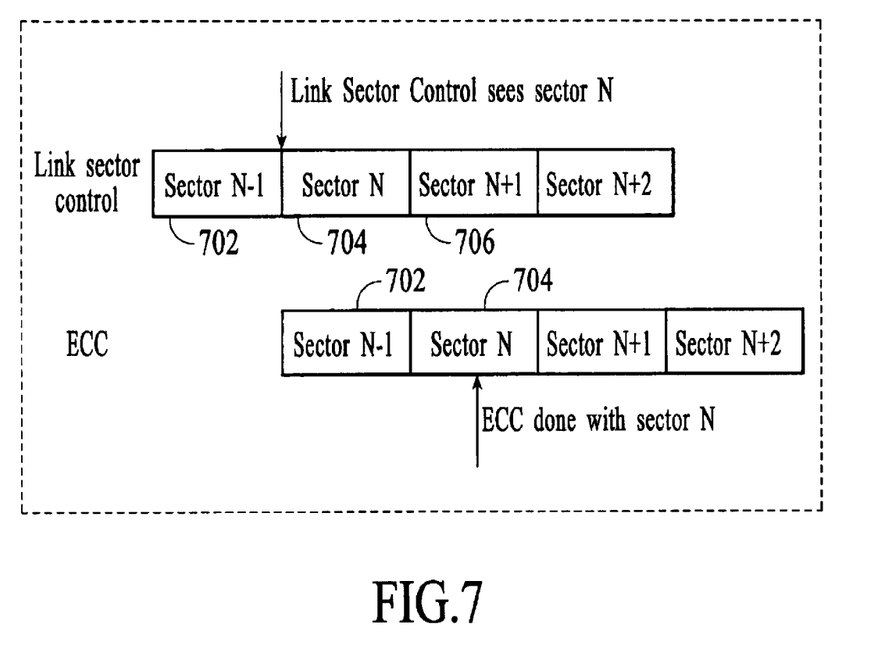
FIG. 7 illustrates the timing relationship between the Link Sector Control and the Error Correction Code in accordance with the present invention.

FIG. 7 illustrates the timing relationship between the Link Sector Control 400 and the ECC 410. Once the Link Detect 402 sees the link sector 702, it continues by processing the second sector 704. If the link sector 602 contains an error, then ECC correction is performed. The ECC correction of link sector 702 occurs while the Link Detect 402 is processing the second sector 704. Similarly, if sector 704 has an error, then the ECC 410 is done with correcting sector 704, the Link Sector Control 400 is processing the third sector 706. Thus, when there is no error, then the current link sector is RO1. When there is an error and ECC correction is performed, then the current link sector is one sector later, or is RO2.

Returning to FIG. 6, once the Link Skip Control 404 determines the current link sector location, it disables the SSD 408, via step 604d at the beginning of the link block 108 and enables the SDD 408 again shortly after, via step 604e. Since there may be a sync pattern in the link block 108, the SSD 408 is disabled at the beginning of the link block 108, and then enabled shortly thereafter, to prevent the SSD 408 from erroneously detecting the link block 108 as RI1 due to the sync pattern. In the preferred embodiment, in addition to directing the data flow, the Link Skip Control 404 sends a sector address update signal 426 (Addr_Freeze/Incr_update) to Header Search and Validation (not shown). The Header Search and Validation updates the current expected sector address for the data block 102 for the current sector location. An address freeze mode update is sent if the link sector address freeze mode is chosen. Otherwise, an address incremental mode update is sent. If the current link sector is RO1, then it keeps the current expected sector address in the address freeze mode, and increases the current expected sector address by seven in the address incremental mode. If the current link sector is RO2, then it uses the previous expected sector address for the current expected sector address in the address freeze mode, and increases the previous expected sector address by seven in the address incremental mode.

Next, the Link Skip Control 404 stops the current buffering, via step 606, by sending a buffering disable signal (not shown) to the DBC 412. At the same time, the Link Skip Control 404 also sends a rollback signal to the Buffer Manager 306 based upon the location of the current link sector, via step 608. If the current sector location is determined to be RO1, via step 608a, then a rollback one signal 428 (Rollback_One) is sent, via step 608b, otherwise a rollback two signal (Rollback_Two) is sent, via step 508c. Based on the rollback signal, the Buffer Manager 306 can discard either the RO1 sector data buffered in the DRAM 308 or both the RO1 and RO2 sector data.

Figure 8:
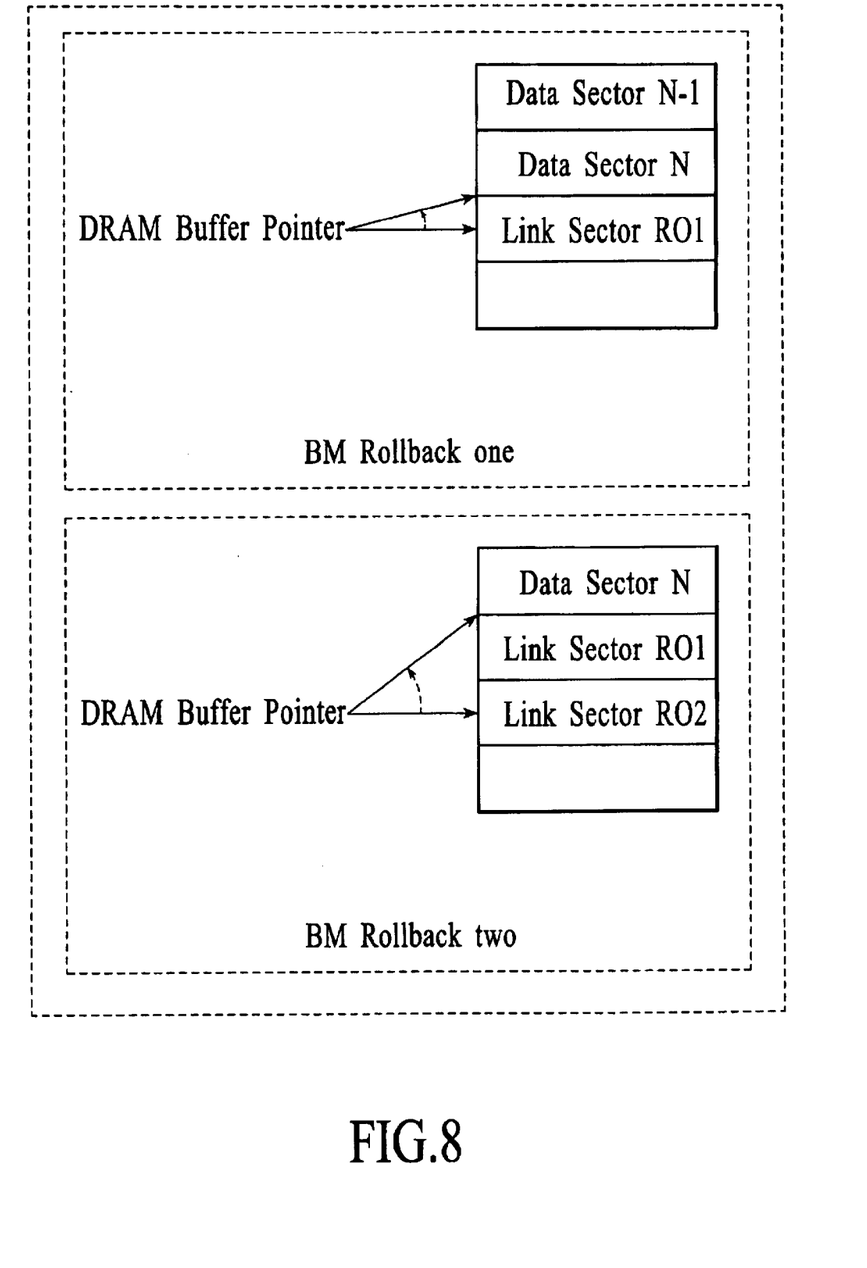
FIG. 8 illustrates the rollback process in accordance with the present invention.

FIG. 8 illustrates the rollback process in accordance with the present invention. When a rollback one signal 428 is sent, the DRAM buffer pointer is rolled back one sector to the beginning of the RO1 location, as illustrated in the top diagram. When a rollback two signal 430 is sent, the DRAM buffer pointer is rolled back two sectors to the beginning of the RO1 location, as illustrated in the bottom diagram.

Once the rollback is performed, via step 608, the Link Skip Control 404 continues to monitor the current sector location, until it finds sector RI4, the end of the link sectors, via step 610. It then enables the DBC 412 to resume buffering at the end of sector RI4, via step 612, when the data block sectors 102 begin. Since the DRAM buffer pointer has been rolled back, the RO1 and/or RO2 is written over by the buffered data block sectors 102.

Figure 9:
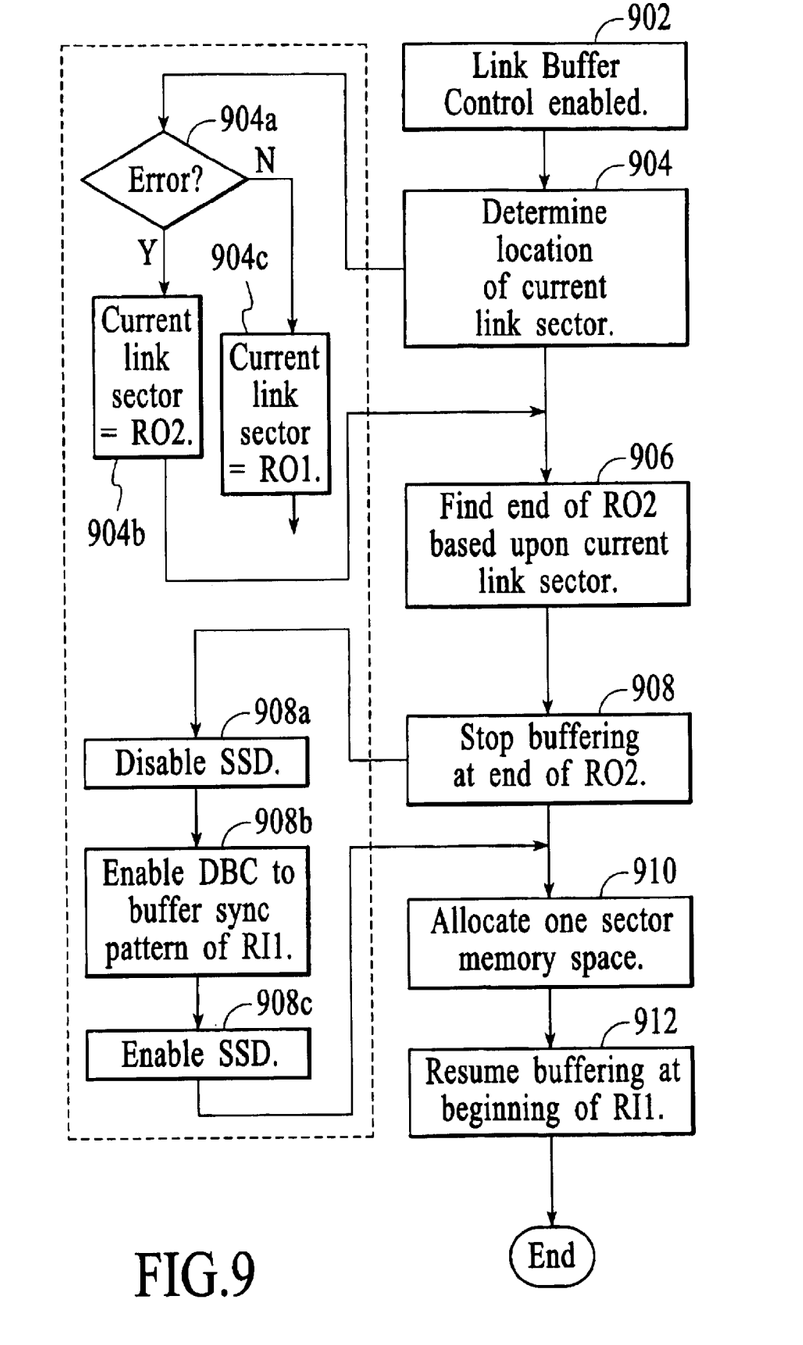
FIG. 9 is a flowchart illustrating a preferred embodiment of the method in accordance with the present invention when the link buffer method has been selected.

FIG. 9 is a flowchart illustrating a preferred embodiment of the method in accordance with the present invention when the link buffer method has been selected. First, the Link Buffer Control 406 is enabled by the Link Detect 402, via step 902. As with the Link Skip Control 404, the Link Buffer Control 406 first determines the location of the current link sector, via step 904. If the sector is determined to have error, via step 904a, then the current link sector location is RO2, via step 904b. If the sector does not have error, i.e., the erasure signal 418 is a zero, then the current sector location is RO1, via step 904c. Based on this location information, the Link Buffer Control 406 finds the end of the sector RO2, via step 906. The buffering is then stopped at the end of sector RO2, via step 908. In the preferred embodiment, the SSD 408 is also disabled after sector RO2, via step 908a, and the DBC 412 is enabled by the sync transfer enable signal 436 (sync_TX_EN) to buffer the sync pattern of sector RI1, via step 908b. After the sync pattern is sent, the Link Buffer Control 406 enables the SSD again, via step 908c.

Figure 10:
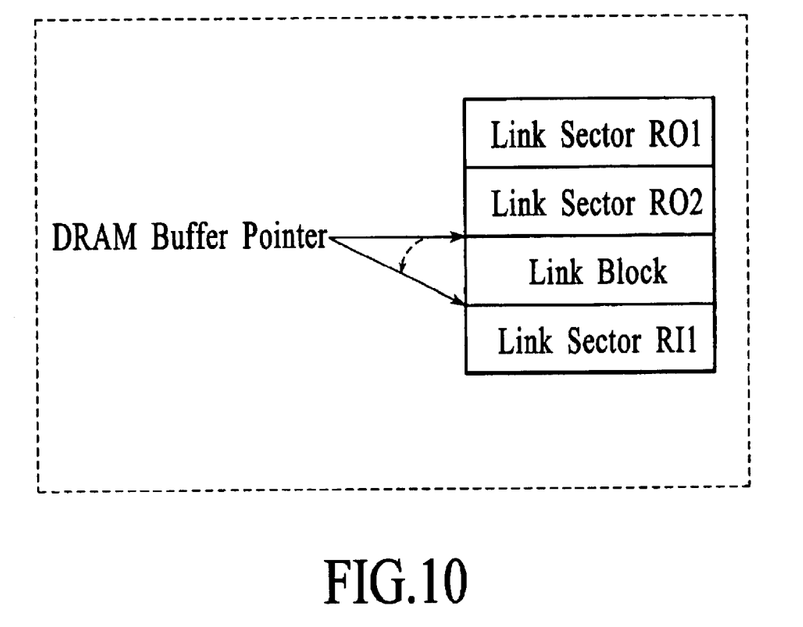
FIG. 10 illustrates the link jump process in accordance with the present invention.

Next, the Link Buffer Control 406 sends a link jump signal 432 (Link_Jump) to the BM 306 that will allocate one sector memory space for the link block 108, via step 910. SSD 408 is disabled at the same time that the link jump signal 432 is activated. FIG. 10 illustrates the link jump process in accordance with the present invention. When the link jump signal 432 is sent, the BM 306 sets the DRAM buffer pointer to the next sector location, as illustrated. Returning to FIG. 9, the Link Buffer Control 406 then resumes the buffering at the beginning of RI1, via step 912. Since the fixed sync pattern of RI1 is already buffered, via step 908b, the DBC 412 is enabled as soon as this sync pattern is detected. Since the link sectors 104–108 are buffered by the Link Buffer Control 406, the incremental mode is used, and the current expected sector address is incrementally increased.

Although the present invention is disclosed in the context of the controller illustrated in FIG. 3, one of ordinary skill in the art will understand that any controller for writable or rewritable optical media may be used without departing from the spirit and scope of the present invention.

An improved method and system for link sector detection and handling for optical media has been disclosed. The present invention provides a hardware approach to link sector detection and handling. Instead of passing the data to a system software prior to link sector detection, the method and system in accordance with the present invention performs the link sector detection in the controller hardware. When the controller detects the link sectors, it automatically either skips or buffers the link sectors depending upon the configuration of the controller. By performing the link sector detection in hardware, significant processing time is saved.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for handling a data stream from an optical medium, the data stream comprising a plurality of data sectors and a plurality of link sectors, comprising the steps of:

(a) detecting one of the plurality of link sectors;

(b) generating an interrupt signal;

(c) determining a buffer method selection;

(d) buffering the plurality of data sectors only, if a link skip buffer method is selected; and (e) buffering the plurality of data sectors and the plurality of link sectors, except for a link block, and allocating a sector in a buffer for the link block, if a link buffer method is selected.

2. The method of claim 1, wherein the buffering the plurality of data sectors only step (d) comprises:
   (d1) determining a location of a current link sector;
   (d2) stop buffering the data stream;
   (d3) rolling back a buffer's pointer based upon the location of the current link sector;
   (d4) resume buffering at a beginning of a next plurality of data sectors.

3. The method of claim 2, wherein the determining step (d1) comprises:
   (d1i) determining if the current link sector has an error, wherein the current link sector is a first RO sector if the current link sector has no error, wherein the current link sector is a second Read Out (RO) sector if the current link sector has the error;
   (d1ii) disabling a Sector Sync Detect (SSD);
   (d1iii) enabling the SSD; and
   (d1iv) updating a current expected sector address.

4. The method of claim 2, wherein the rolling step (d3) comprises:
   (d3i) sending a rollback one signal to a buffer manager (BM) if the current link sector is a first RO sector; and
   (d3ii) sending a rollback two signal to the BM if the current link sector is a second RO sector.

5. The method of claim 4, wherein the rollback one and rollback two signals move the buffer's pointer toga beginning of the first RO sector.

6. The method of claim 1, wherein the buffering the plurality of data sectors and the plurality of link sectors step (e) comprises:
   (e1) determining a location of a current link sector;
   (e2) finding an end of a second RO sector based upon the location of the current link sector;
   (e3) stop buffering the data stream at the end of the second RO sector;
   (e4) allocating one sector in a buffer for the link block; and
   (e5) resume buffering at a beginning of a first RI sector.

7. The method of claim 6, wherein the determining step (e1) comprises:
   (e1i) determining if the current link sector has an error, wherein the current link sector is a first RO sector if the current link sector has no error, wherein the current link sector is the second RO sector if the current link sector has the error;
   (e1ii) disabling a SSD;
   (e1iii) enabling a Data Buffer Control (DBC) to buffer a sync pattern of the first RI sector; and
   (e1iv) enabling the SSD.

8. A method for handling a data stream from an optical medium, the data stream comprising a plurality of data sectors and a plurality of link sectors, comprising the steps of:
   (a) detecting one of the plurality of link sectors;
   (b) generating an interrupt signal;
   (c) determining a buffer method selection;
   (d) determining a location of a current link sector;
   (e) stop buffering the data stream;
   (f) rolling back a buffer's pointer based upon the location of the current link sector; and
   (g) resume buffering at a beginning of a next plurality of data sectors.

9. The method of claim 8, wherein the determining step (d) comprises:
   (d1) determining if the current link sector has an error, wherein the current link sector is a first RO sector if the current link sector has no error, wherein the current link sector is a second RO sector if the current link sector has the error;
   (d2) disabling a Sector Sync Detect (SSD);
   (d3) enabling the SSD; and
   (d4) updating a current expected sector address.

10. The method of claim 8, wherein the rolling step (f) comprises:
    (f1) sending a rollback one signal to a buffer manager (BM) if the current link sector is a first RO sector; and
    (f2) sending a rollback two signal to the BM if the current link sector is a second RO sector.

11. The method of claim 10, wherein the rollback one and rollback two signals move the buffer's pointer to a beginning of the first RO sector.

12. A method for handling a data stream from an optical medium, the data stream comprising a plurality of data sectors and a plurality of link sectors, comprising the stops of:
    (a) detecting one of the plurality of link sectors;
    (b) generating an interrupt signal;
    (c) determining a location of a current link sector;
    (d) finding an end of a second RO sector based upon the location of the current link sector;
    (e) stop buffering the data stream at the end of the second RO sector;
    (f) allocating one sector in a buffer for a link block; and
    (g) resume buffering at a beginning of a first RI sector.

13. The method of claim 12, wherein the determining step (c) comprising:
    (c1) determining if the current link sector has an error, wherein the current link sector is a first RO sector if the current link sector has no error, wherein the current link sector is the second RO sector if the current link sector has the error;
    (c2) disabling a SSD;
    (c3) enabling a Data Buffer Control (DBC) to buffer a sync pattern of the first RI sector; and
    (c4) enabling the SSD.

14. A system for handling a data stream from an optical medium, comprising:
    a memory; and
    a link sector control coupled to the memory, comprising:
       a link detect for detecting a link sector of a data stream and for generating an interrupt signal;
       a link skip control coupled to the link detect for buffering a plurality of data sectors of the data stream if a link skip buffer method is selected, and
       a link buffer control coupled to the link detect for buffering the plurality of data sectors and a plurality of link sectors of the data stream, except for a link block, and for allocating a sector in the memory for the link block, if a link buffer method is selected.

15. The system of claim 14, wherein the link detect comprises:
    a plurality of input signals, the plurality of input signals comprising a block indicator signal, a link skip/buffer selection signal, a data erasure bit, and an ECC done signal; and
    a plurality of output signals, the plurality of output signals comprising a link detect interrupt signal, a signal enabling the link skip control, and a signal enabling the link buffer control.

16. The system of claim 15, wherein the block indicator signal provides three bits indicating a type of data in a sector.

17. The system of claim 15, wherein the link skip/buffer selection signal indicates which method of handling a detected link sector has been selected.

18. The system of claim 15, wherein the data erasure bit indicates whether or not data error is associated with a sector header.

19. The system of claim 15, wherein the ECC done signal indicates whether nor not an ECC correction has been completed.

20. The system of claim 14, wherein the link skip control comprises a plurality of output signals, wherein the plurality of output signals comprises an SSD disable signal, a sector address update signal, a rollback one signal, and a rollback two signal.

21. The system of claim 20, wherein the SDD disable signal of the link skip control disables a SDD at a beginning of the link block.

22. The system of claim 20, wherein the sector address update signal updates a current expected sector address for the plurality of data blocks for a current sector location.

23. The system of claim 20, wherein the rollback one signal rolls a pointer of the memory back one sector.

24. The system of claim 20, wherein the rollback two signal rolls a pointer of the memory back two sectors.

25. The system of claim 14, wherein the link buffer control comprises a plurality of output signals, the plurality of output signals comprising a link jump signal, an SSD disable signal, and a sync transfer enable signal.

26. The system of claim 25, wherein the link jump signal allocates one sector in the memory for the link block.

27. The system of claim 25, wherein the sync transfer enable signal buffers a sync pattern of a first RI sector.

28. A system for handling a data stream from an optical medium, comprising:
a memory; and
a link sector control coupled to the memory, comprising:
a link detect for detecting a link sector of a data stream and for generating an interrupt signal, the link detect comprising a plurality of input signals and a plurality of output signals,
wherein the plurality of input signals comprises a block indicator signal, a link skip/buffer selection signal, a data erasure bit, and an ECC done signal,
wherein the plurality of output signals comprises a link detect interrupt signal, a signal enabling the link skip control, and a signal enabling the link buffer control;
a link skip control coupled to the link detect for buffering a plurality of data sectors of the data stream if a link skip buffer method is selected, the link skip control comprising a plurality of output signals, wherein the plurality of output signals comprises an SSD disable signal, a sector address update signal, a rollback one signal, and a rollback two signal; and
a link buffer control coupled to the link detect for buffering a plurality of data sectors and a plurality of link sectors of the data stream, except for a link block, and for allocating a sector in the memory for the link block, if a link buffer method is selected, the link buffer control comprising a plurality of output signals, wherein the plurality of output signals comprises a link jump signal, an SSD disable signal, and a sync transfer enable signal.

29. The system of claim 28, wherein the block indicator signal provides three bits indicating a type of data in a sector.

30. The system of claim 28, wherein the link skip/buffer selection signal indicates which method of handling a detected link sector has been selected.

31. The system of claim 28, wherein the data erasure bit indicates whether or not data error is associated with a sector header.

32. The system of claim 28, wherein the ECC done signal indicates whether nor not an ECC correction has been completed.

33. The system of claim 28, wherein the SDD disable signal of the link skip control disables a SDD at a beginning of the link block.

34. The system of claim 28, wherein the sector address update signal updates a current expected sector address for the plurality of data blocks for a current sector location.

35. The system of claim 28, wherein the rollback one signal rolls a pointer of the memory back one sector.

36. The system of claim 28, wherein the rollback two signal rolls a pointer of the memory back two sectors.

37. The system of claim 28, wherein the link jump signal allocates one sector in the memory for the link block.

38. The system of claim 28, wherein the sync transfer enable signal buffers a sync pattern of a first RI sector.

39. A system for handling a data stream, comprising:
an apparatus for retrieving a data stream from an optical medium, the data stream comprising a plurality of data sectors and a plurality of link sectors; and
a controller coupled to the apparatus, the controller comprising:
a memory, and
an integrated encoder/decoder engine, wherein the integrated encoder/decoder engine comprises:
a link sector control coupled to the memory, comprising:
a link detect for detecting one of the plurality of link sectors and for generating an interrupt signal, the link detect comprising a plurality of input signals and a plurality of output signals, wherein the plurality of input signals comprises a block indicator signal, a link skip/buffer selection signal, a data erasure bit, and an ECC done signal,
wherein the plurality of output signals comprises a link detect interrupt signal, a signal enabling the link skip control, and a signal enabling the link buffer control;
a link skip control coupled to the link detect for buffering the plurality of data sectors of the data stream if a link skip buffer method is selected, the link skip control comprising a plurality of output signals wherein the plurality of output signals comprises an SSD disable signal, a sector address update signal, a rollback one signal, and a rollback two signal; and
a link buffer control coupled to the link detect for buffering the plurality of data sectors and the plurality of link sectors of the data stream, except for a link block, and for allocating a sector in the memory for the link block, if a link buffer method is selected, the link buffer control comprising a plurality of output signals, wherein the plurality of output signals comprises a link jump signal, an SSD disable signal, and a sync transfer enable signal.

40. A system for handling a data stream from an optical medium, the data stream comprising a plurality of data sectors and a plurality of link sectors, comprising:
means for detecting one of the plurality of link sectors;
means for generating a link sector detect interrupt signal;
means for determining a buffer method selection;
means for buffering the data sectors only, if a link skip buffer method is selected; and
means for buffering the plurality of data sectors and the plurality of link sectors, except for a link block, and allocating a sector for the link block in a buffer, if a link buffer method is selected.

* * * * *